United States Patent [19]
Liou et al.

[11] Patent Number: 6,072,612
[45] Date of Patent: Jun. 6, 2000

[54] WDM TRANSMITTER FOR OPTICAL NETWORKS USING A LOOP-BACK SPECTRALLY SLICED LIGHT EMITTING DEVICE

[75] Inventors: Kang-Yih Liou, Holmdel; Uziel Koren, Fair Haven, both of N.J.

[73] Assignee: Lucent Technologies, Inc., Murray Hill, N.J.

[21] Appl. No.: 08/910,939

[22] Filed: Aug. 8, 1997

[51] Int. Cl.[7] .............................. H04B 10/04; H04J 14/02
[52] U.S. Cl. .......................... 359/123; 359/130; 359/132; 359/140; 359/187
[58] Field of Search ..................................... 359/123, 130, 359/132, 139, 127, 124, 180, 187, 188, 140

[56] References Cited

U.S. PATENT DOCUMENTS

| | | | |
|---|---|---|---|
| 5,402,256 | 3/1995 | Spanke ..................................... | 359/140 |
| 5,438,445 | 8/1995 | Nakano ................................... | 359/124 |
| 5,479,286 | 12/1995 | Stalley et al. ............................ | 359/125 |
| 5,574,584 | 11/1996 | Darcie et al. ............................ | 359/125 |
| 5,729,369 | 3/1998 | Zirngibl .................................. | 359/123 |
| 5,861,965 | 1/1999 | Koren ..................................... | 359/123 |
| 5,912,749 | 6/1999 | Harstead et al. ........................ | 359/123 |

OTHER PUBLICATIONS

B. Glance et al., "Applications of the Integrated Waveguide Grating Router" Journal of Lightwave Technology, vol. 12, No. 6, Jun. 1994, pp. 957–962.

C.R. Giles et al., Access PON Using Downstream 1550–nm WDM Routing and Upstream 1300–nm SCMA Combining Through a Fiber–Grating Router, IEEE Photonics Technology Letters, vol. 8, No. 11, Nov. 1996, pp. 1549–1551.

K.–Y. Liou et al., "System Performance of an Eight–Channel WDM Local Access Network Employing a Spectrum–Sliced and Delay–Line–Multiplexed LED Source", IEEE Photonics Technology Letters, vol. 9, No. 5, May 1997, pp. 696–698.

K.–Y. Liou et al., "A WDM Access System Architecture Based on Spectral Slicing of an Amplified LED and Delay–Line Multiplexing and Encoding of Eight Wavelength Channels for 64 Subscribers" IEEE Photonics Technology Letters, vol. 9, No. 4, Apr. 1997, pp. 517–519.

"Dense Wavelength Division Multiplexers" Lucent Technologies Bell Labs Innovations.

"Dense WDM Multiplexing by Arrayed–Waveguide Grating Technology", Photonic Integration Research, Inc., vol. No. 12, Feb. 1997.

C. Dragone, "An N×N Optical Multiplexer Using a Planar Arrangement of Two Star Couplers" IEEE Photonics Technology Letters vol. 3, No. 9, Sep. 1991, pp. 812–815.

*Primary Examiner*—Leslie Pascal

[57] ABSTRACT

An apparatus and method pulses a broadband optical source such as an LED, and generates multiple optical wavelength signals channels which are time division multiplexed onto a single optical channel. The multiple optical wavelength signals may subsequently be modulated by low frequency data signals and then transmitted to a receiver as corresponding multiple independent optical wavelength channels over a single optical fiber. Both spectral slicing and time division multiplexing are accomplished by a wavelength channel defining assembly including a wavelength grating router (WGR) and optical delay lines by using the periodic routing characteristics of the WGR. The WGR separates the broadband optical signal appearing at one input port of the WGR into discrete wavelength bands constituting respective pulses defining the optical wavelength channels by spectrally slicing the broadband optical source frequency spectrum with a multiple channel filter. The WGR then routes each of the wavelength signals to corresponding output ports. Optical delay lines then loop-back the separate wavelength signals from the output ports to other WGR input ports determined according to the routing characteristics of the WGR to multiplex the channels onto a single output port, while also inserting the delay to separate the wavelength signals in time.

12 Claims, 8 Drawing Sheets

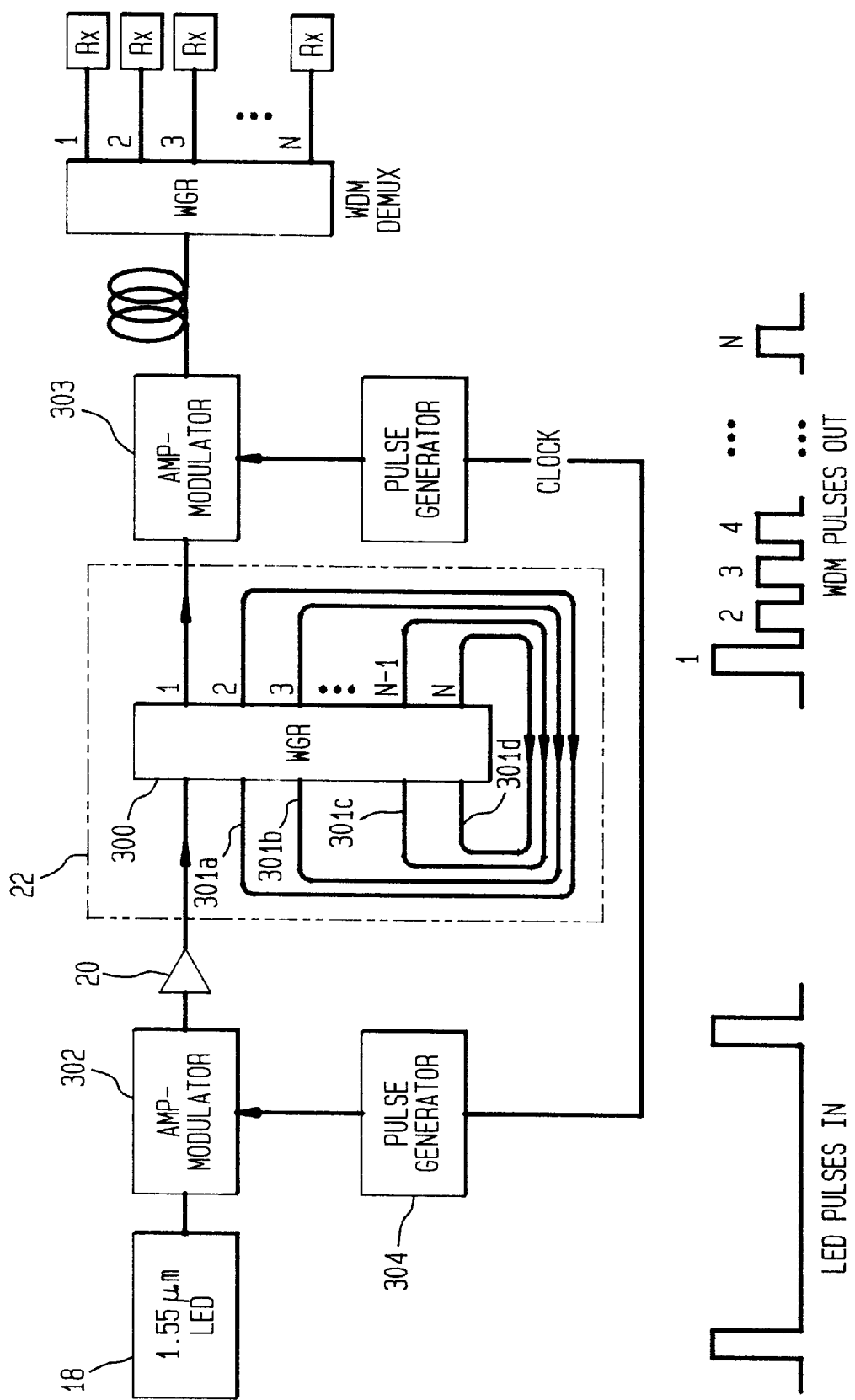

OUTPUT PORT NUMBER

|  | 1 | 2 | 3 | 4 | 5 | 6 | ... | N |
|---|---|---|---|---|---|---|---|---|
| 1 | 1 | 2 | 3 | 4 | 5 | 6 |  | N |
| 2 | 2 | 3 | 4 | 5 | 6 | 7 |  | 1 |
| 3 | 3 | 4 | 5 | 6 | 7 | 8 |  | 2 |
| 4 | 4 | 5 | 6 | 7 | 8 | 9 |  | 3 |
| 5 | 5 | 6 | 7 | 8 | 9 | 10 |  | 4 |
| 6 | 6 | 7 | 8 | 9 | 10 | 11 |  | 5 |
| N | N | 1 | 2 | 3 | 4 | 5 |  | N-1 |

INPUT PORT NUMBER (left); ($N_\lambda$ CHANNEL NO.)

$N_{OUT} = N_\lambda - N_{IN} + 1$ (+N IF $N_{OUT} \leq 0$)

WDM TRANSMITTER FOR OPTICAL NETWORKS USING A LOOP-BACK SPECTRALLY SLICED LIGHT EMITTING DEVICE

FIELD OF THE INVENTION

The present invention relates generally to optical communications systems and, more particularly, to improvements in optical communications systems employing a loop-back, spectrally sliced, broad spectrum optical source.

BACKGROUND OF THE INVENTION

The transmission capacity of optical communications systems is presently limited by the optical source modulation bandwidth and dispersive and nonlinear propagation effects. Although a span of optical fiber has a very broad optical bandwidth (10–20 THz), the system data rates transmitted over such spans are presently limited to about 2.5 Gbits/sec in single-channel communications systems. Wavelength division multiplexing (WDM) generally increases optical system capacity by simultaneously transmitting data on several optical carrier signals at different wavelengths. The total system capacity is increased by a factor equal to the number of different wavelength channels. Other advantages of WDM are realized in point-to-multipoint communications systems such as in fiber-to-the-home. In this case, improved power splitting budget, security, upgradability, service flexibility and lower component speed requirements compared to time-division-multiplex (TDM) point-to-point links make WDM attractive.

WDM systems which have heretofore been proposed generally include a separate optical modulation source for each optical channel or individual transmission wavelength. For example, an array of laser diodes may be used—with each laser diode being tuned to a different frequency and modulated individually. The laser frequencies are combined as, for example, by an optical coupler and are then launched into one end of an optical fiber. At the other end of the fiber, the wavelength channels are separated from one another and directed to corresponding receivers.

Due to a number of technical problems, presently proposed WDM systems are not regarded as being commercially viable for mass market applications like fiber distribution to the home. One such problem is the small number of channels currently accommodated. Specifically, while a WDM system would be considered cost-effective if a large number of channels (32–64 or even 128) were made available, present multi-channel laser diodes are very difficult to fabricate with acceptable yield even with as few as 8 channels. In addition, passive WDM splitters currently available have a large temperature variation of their passband channels, thereby requiring a continuous tunability in the multichannel sources that has not yet been achieved.

Therefore, although WDM offers an elegant solution to increasing the capacity and transparency of optical networks, WDM for fiber distribution networks as currently envisioned is not deemed to be cost-competitive with simple point-to-point schemes (one fiber per customer), and more cost-effective schemes are needed. For fiber-to-the home optical communications systems, low-cost methods of delivering optical signals into and out from the home is a challenging problem. Although time-domain multiplexing (TDM) of data streams would be another method of increasing transmission capacity, it is not desirable to build a specific network with expensive high frequency electronic components that are difficult to upgrade in the future. For example, in order to deliver 50 Mbits/sec data rates into a single house, a 32 channel system would require transmitters, routers, amplifiers, receivers and modulators with 1.5 Gbits/sec capacity and above. It is not desirable to place such expensive and state-of-the-art components into every home. In addition, it is desirable to have as much of the system in the field and in the home transparent and passive, i.e. line-rate independent and not requiring any electrical power. In addition to the low data rate systems as required for local access (50–155 MHz), high data rate systems (622 MHz-2.5 Gbits/sec) can also benefit from WDM. In such a case, similar problems are caused by the difficulty in obtaining a multifrequency source with adequate channel tuning, stability and modulation bandwidth.

Further, a WDM system employing spectral slicing to provide multiple wavelength channels, modulating the wavelength channels with data, and then time division multiplexing the channels together may address some of the problems with present WDM systems. To address some of the aforementioned problems, a WDM system employing spectral slicing of a broadband optical source may be used, and such a system is disclosed in U.S. patent application Ser. No. 08/706,029, titled "OPTICAL COMMUNICATION SYSTEM EMPLOYING SPECTRALLY SLICED OPTICAL SOURCE" incorporated herein by reference and assigned to the assignee of the present invention. However, such systems combining the wavelength channels employ both multiple channel filtering devices, such as wavelength grating routers, which may be expensive, and optical coupling devices, such as star couplers, which may have high insertion losses. For example, the insertion loss of a 1×N star coupler is 1/N (N the number of optical lines coupled). Consequently, there is a need combine or time division multiplex multiple wavelength channels onto a single optical fiber while reducing both component cost and the optical insertion loss during such combination.

As is apparent from the above, there is a continuing need for an efficient and cost-effective WDM system that is capable of transmitting a large number of spectral channels.

SUMMARY OF THE INVENTION

The aforementioned deficiencies are addressed, and an advance is made in the art, by loop-back, spectral slicing of the output spectrum of an optical source. In accordance with an illustrative embodiment of the present invention, a broad spectrum optical source having an optical source signal spectral bandwidth encompassing discrete wavelength bands is coupled to one input port of a channel defining assembly having input and output ports. The channel defining assembly resolves the optical source signal into the discrete wavelength bands and routes the discrete wavelength bands between the input port and at least one output port in accordance with a routing function to define a sequence of individually addressable wavelength channels. The channel defining assembly further couples at least one output port and at least one input port to multiplex the sequence of individually addressable wavelength channels into an optical signal at one output port.

BRIEF DESCRIPTION OF THE DRAWING

The aforementioned features and benefits of the invention will be better understood from a consideration of the detailed description which follows taken in conjunction with the accompanying drawings, in which:

FIG. 3A shows an exemplary system employing loop-back spectral slicing to provide discrete wavelength channels time division multiplexed together in accordance with the present invention;

DETAILED DESCRIPTION
System Overview

According to the present invention, the broad spectrum output from a suitable optical source—illustratively, a light emitting diode (LED) having an output centered at a typical telecommunications wavelength such as, for example, 1550 nm—is processed by a wavelength channel defining assembly having a periodic routing characteristic to form a group of time-division multiplexed wavelength channels by spectral slicing and loop-back of the spectrally sliced channels.

Figure 1:
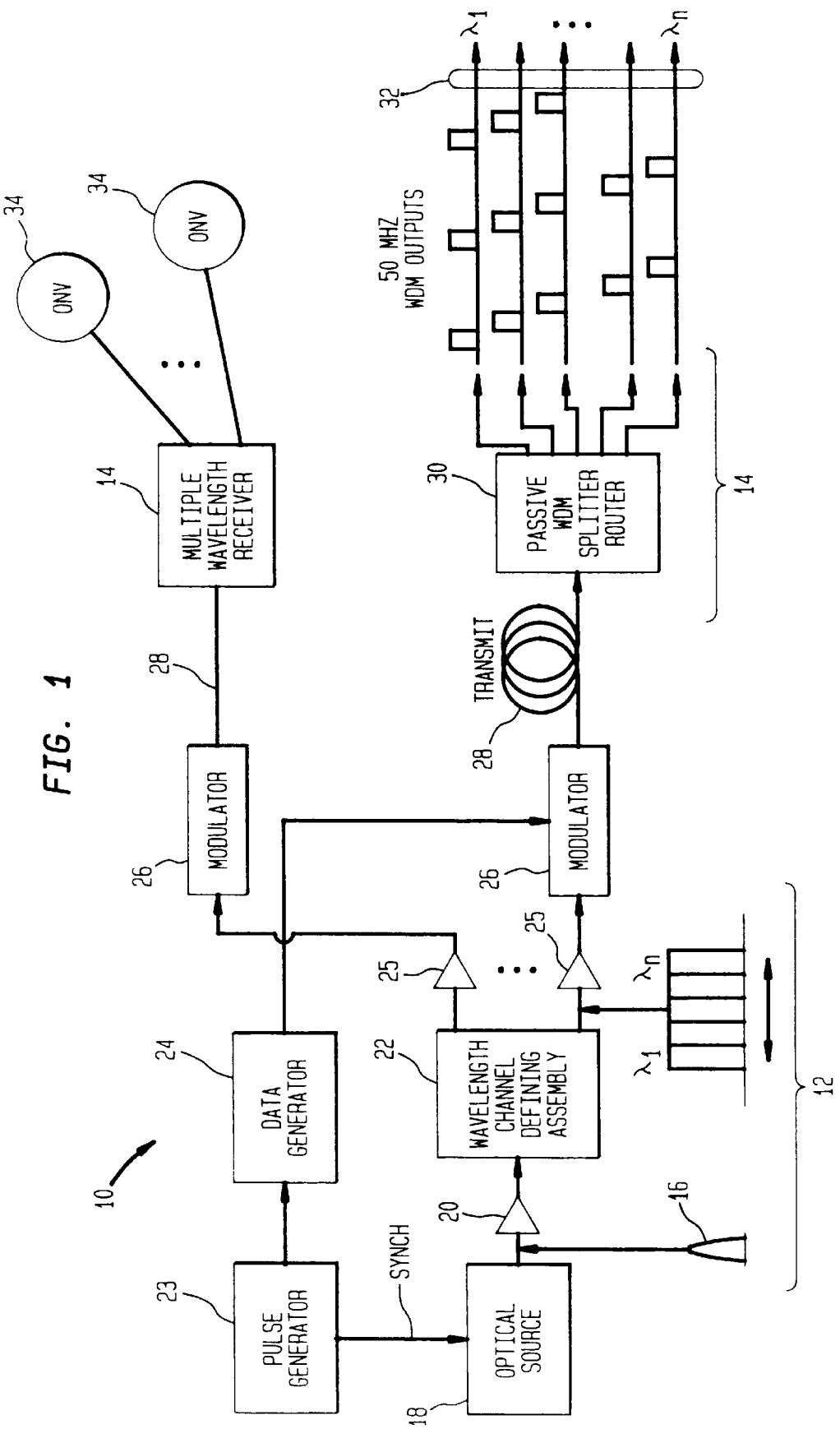
FIG. 1 is a block diagram of a multiple wavelength communication system constructed in accordance with the present invention.
Figure 2A:
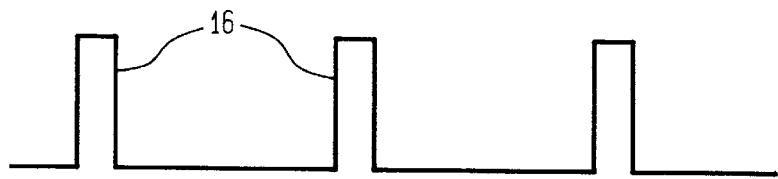
FIG. 2A is a graphical representation of an illustrative sequence of broad spectrum pulses provided by an optical source in accordance with the present invention.
Figure 2B:
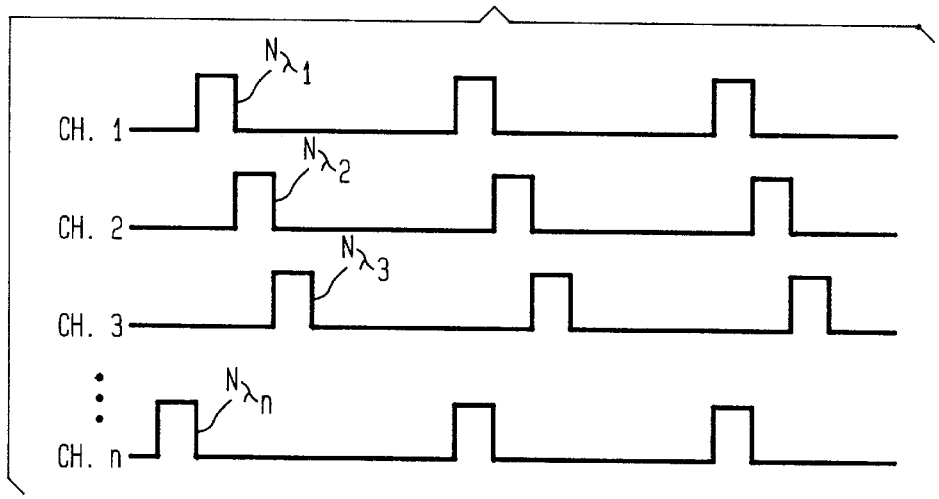
FIG. 2B is a graphical representation of discrete wavelength channels following spectral slicing of a broad spectrum pulse.

An illustrative multiple wavelength optical communication system 10 constructed in accordance with the present invention is shown schematically in FIG. 1. As seen in FIG. 1, system 10 includes a transmitter 12 and a receiver 14. A broad spectrum optical pulse 16, from optical source 18, is amplified by amplifier 20 and supplied to wavelength channel defining assembly 22. A pulse generator 23 determines the width and repetition rate of the broad spectrum pulses which, illustratively, may be 2.5 ns and 20 ns, respectively, as shown in FIG. 2A. As will be explained in greater detail below, wavelength channel defining assembly 22 is operable to spectrally slice the output pulses supplied by optical source 18 into a plurality of discrete wavelength bands in the form of individual pulses $\lambda_1$ through $\lambda_n$ and, as indicated conceptually in FIG. 2B, insert a time delay between them so that they are individually addressable. That is, the broad spectrum source is spectrally sliced and processed to form a series of modulated data pulses, each at a different wavelength.

Figure 2C:
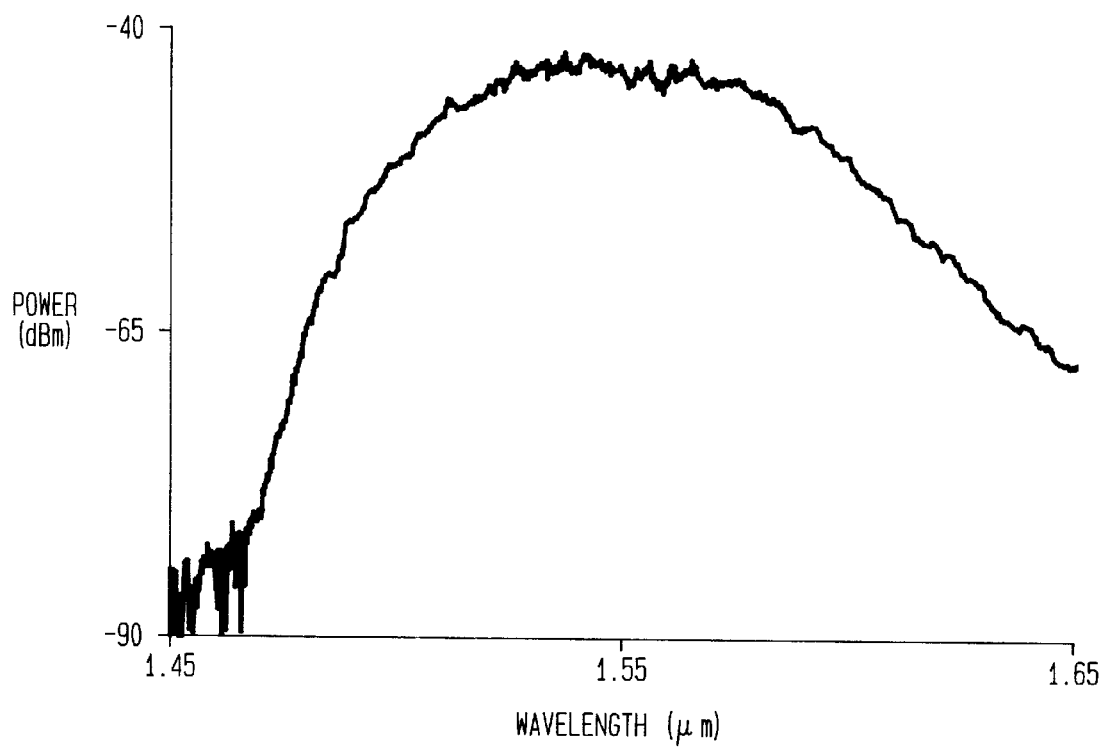
FIG. 2C illustrates an exemplary frequency spectrum of a light emitting diode (LED) which may be employed as a broad spectrum optical source in accordance with an exemplary embodiment of the present invention.

FIG. 2C illustrates an exemplary frequency spectrum of a light emitting diode (LED) which may be employed as a broad spectrum optical source in accordance with an exemplary embodiment of the present invention. To deliver an exemplary data rate of 50 Mb/s per wavelength channel, optical source 18 comprising the LED having the exemplary frequency spectrum may be directly modulated to −7.9 dBm peak power, with 2.5 ns pulses at a repetition rate of 20 ns for an 8 WDM channel system.

Each different wavelength (referred to herein as a wavelength channel) is modulated with the information to be transmitted on that particular channel. The transmitter 12 of the present invention provides a method of transmitting data on many separate wavelength channels, using only a single broadband modulator. Optionally, a frequency-dependent filter (not shown) such as, for example, a cladding-dumping fiber grating or a multilayer interference filter may be connected to the output of wavelength channel defining assembly 22 to equalize the power spectra of some or all of the optical wavelength channels.

In the exemplary embodiment of FIG. 1, a data generator 24 generates multiple low-frequency data signals (illustratively 8–24 channels at 50 Mbits/sec per channel, for local access applications) that are time-division-multiplexed (TDM) up to a high data rate (400–800 Mbits/sec), in this example by an electronic TDM unit (not shown). The resulting wavelength channels are encoded by modulator 26 using the high data rate signal output by the wavelength channel defining assembly and amplified by amplifier 25. As will be readily appreciated by those skilled in the art, the high data rate signal should have a data rate which is at least equal to the rate ($\gamma$) of the broad spectrum pulse rate multiplied by the number of wavelength channels utilized.

Advantageously, the high data rate signal may be encoded onto the multiple channel optical signal by passing it through a broadband optical modulator 26. This modulator 26 is capable of modulating optical signals over a wide wavelength range (50 nm bandwidth, typically) and has low polarization dependence.

Loop-back WGR Channel Defining Assembly

An exemplary system employing loop-back spectral slicing and utilizing an LED centered at 1550 nm as the optical source 18 is illustrated in FIG. 3A. It should be noted that although an output spectrum centered about 1550 nm is shown and described in detail herein, it is nonetheless contemplated that the output spectrum of the optical source might alternatively be centered about some other wavelength of interest such, for example, as 1300 nm, and that reference herein to any particular wavelength band is by way of illustrative example only.

As will be readily appreciated by those skilled in the art, the number of subscribers which may be served by a single optical source is dependent upon its output power. In the exemplary arrangement of FIG. 3A, in which the optical source 18 is an LED centered at 1550 nm, amplifier 20 is preferably configured as a conventional erbium doped fiber amplifier (EDFA). Fiber amplifiers are not currently available, however, for many other wavelength bands as, for example, those around 1300 nm. In such cases, a semiconductor optical amplifier may be employed. The semiconductor optical amplifier may, if desired, be integrated with an LED optical source to obtain a monolithically integrated LED-amplifier structure. The fabrication of such devices is believed to be well within the skill of those familiar with the art. For a detailed description of an integrated LED-amplifier suitable for 1300 nm, however, reference may be had to a paper by K.-Y. Liou et al. entitled "Monolithically Integrated Semiconductor LED-Amplifier for Application as Transceiver in Fiber Access Systems", IEEE Photonics Technology Letters, Vol. 8, pp. 800–802, 1996.

With continued reference to the illustrative embodiment of FIG. 3A, it will be seen that wavelength channel defining assembly 22 includes a multiple channel filtering device, which is a waveguide grating router (WGR) 300, and a group of optical delay lines 301a–301d. WGR 300 selects and routes each successive wavelength channel to a corresponding optical delay line (e.g., optical fiber sections) 301a–301d with as little crosstalk between the adjacent channels as possible.

Figure 4A:
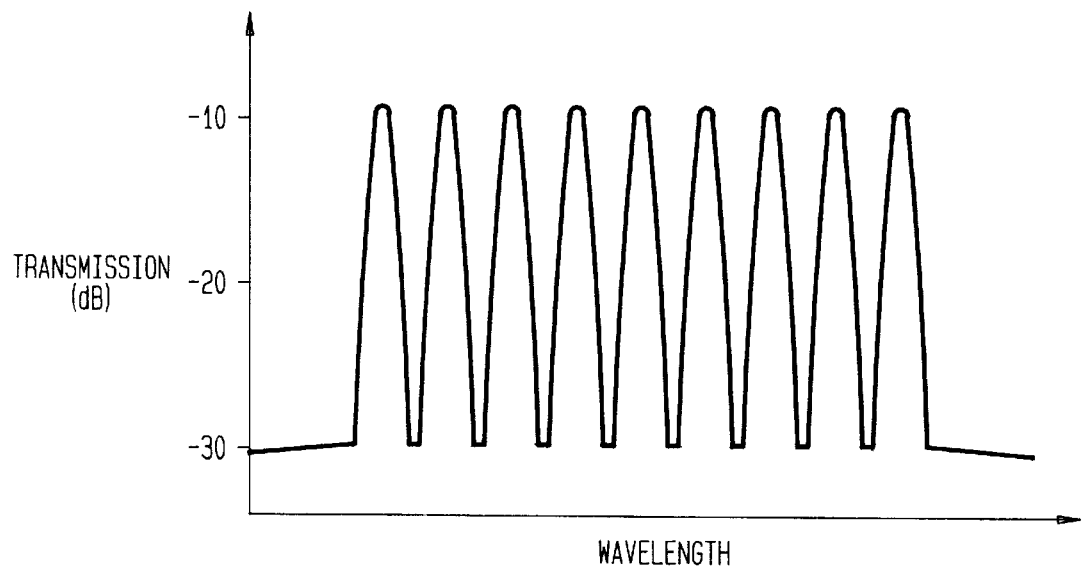
FIG. 4A is a graphical representation of a transmission spectrum of an ideal multiple-channel filter device.
Figure 4B:
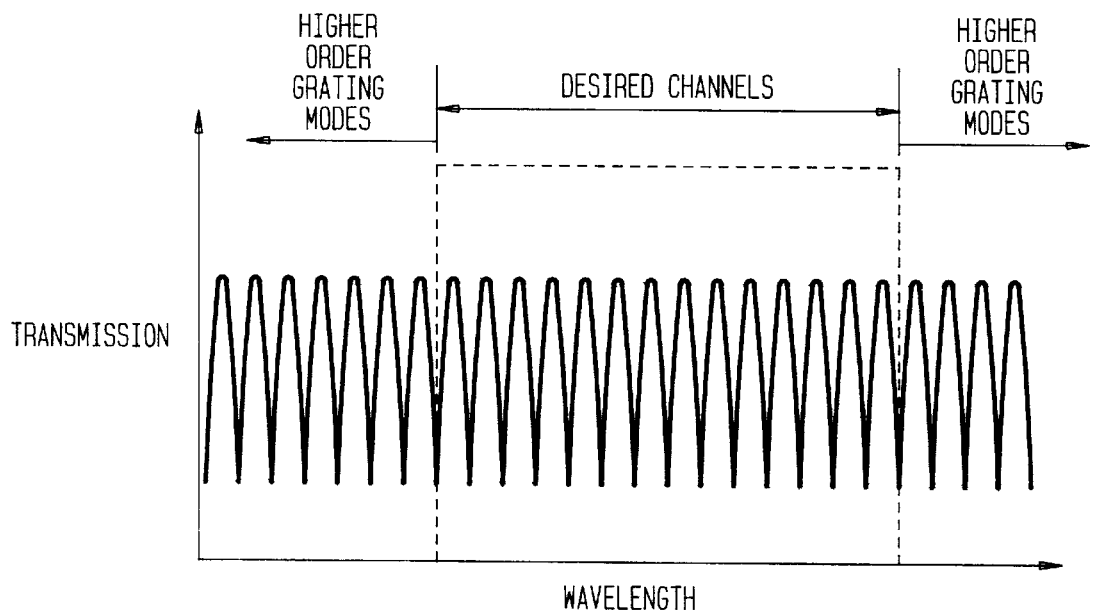
FIG. 4B is a graphical representation of a periodic pass-band transmission characteristic of an integrated optic wavelength grating router of the present invention.

The transmission spectrum (wavelength comb) of an ideal multiple-channel filter device which may be employed is shown in FIG. 4A. By applying the broadband spectrum of an optical device such as shown in FIG. 2C to an ideal multiple channel filtering device such as that shown in FIG. 4A, spectral slicing is accomplished since the broad spectrum is divided into discrete frequency bands. However, devices such as the WGR 300 have a transmission spectrum which only approximates the ideal wavelength comb characteristic. FIG. 4B shows the integrated-optic WGR 300 employed as the multiple channel filter device for spectral slicing has a periodic passband transmission characteristic: within the band center, there are a number of desired transmission channels, but outside of that region, the WGR 300 exhibits a periodic passband behavior. For a detailed description of the construction and operation of such a router, reference may be had to a paper by C. Dragone et al. entitled "Integrated Optics NxN Multiplexer on Silicon" IEEE Photonics Technology Letters, Vol. 3, pp. 896–899, 1991.

Figures 4C, 5:
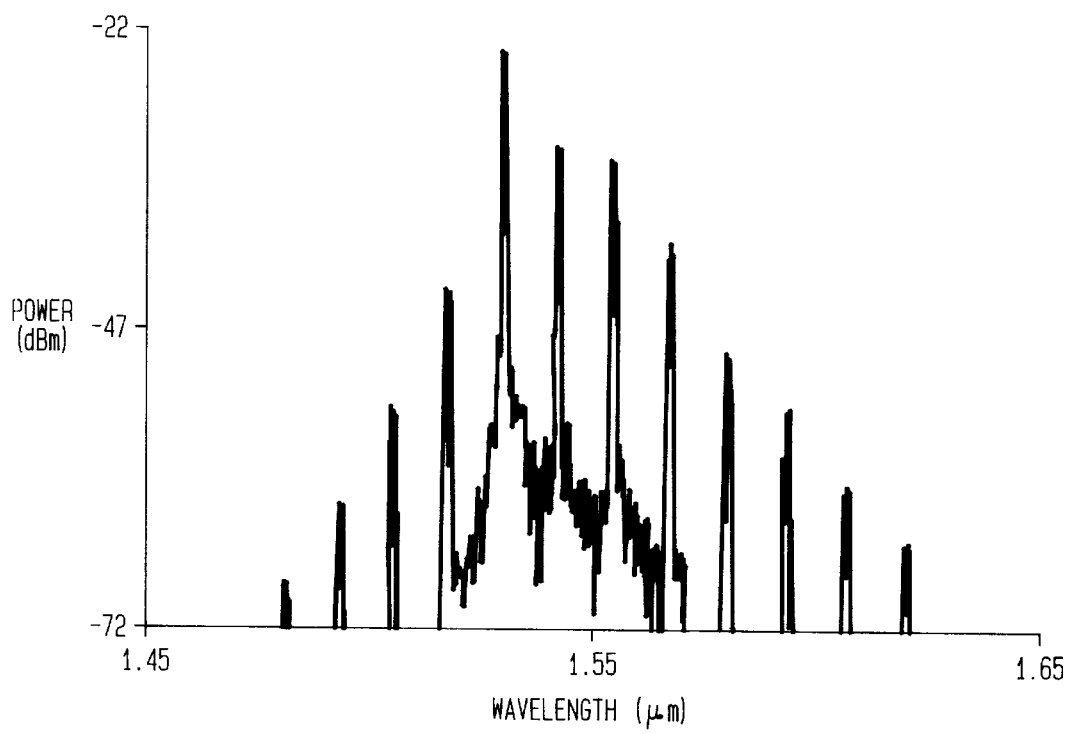
FIG. 4C illustrates the frequency spectrum of a broadband optical source following amplification and spectral slicing to provide discrete wavelength channels for the exemplary frequency spectrum of a light emitting diode (LED) of FIG. 2C.
FIG. 5 illustrates a routing matrix for the wavelength grating router of the present invention.

FIG. 4C illustrates the frequency spectrum of a wavelength channel derived from a broadband optical source following amplification and spectral slicing when WGR 300 is used to provide discrete wavelength channels for the exemplary frequency spectrum of a light emitting diode (LED) of FIG. 2C. The repeating peaks in FIG. 4C show the effect of the periodic passband transmission characteristic, and are separated by 12.8 nm free spectral range of the WGR. All other channels exhibit similar spectral characteristics, except that they are equally spaced by the 1.6 nm channel spacing of the WGR.

The optical delay lines 301a–301d for the exemplary embodiment of a 24 WDM channel system are passive, although active devices may also be used. Each of the passive optical delay lines 301a–301d may be implemented as a single mode fiber operated at 1.5 with an index of 1.50, which corresponds to a delay factor of 0.05 ns/cm. Accordingly, inserting a single mode fiber of length 17 cm corresponds to inserting a delay time of 0.85 ns. Slight variations in delay time may occur as a result of variations in the index of the fiber.

In the exemplary embodiment, a loop-back spectral slicing scheme is employed for WGR 300 implemented as a 24 channel WDM source utilizing a periodic routing property of the WGR. For the exemplary embodiment, a 24x24 silica WGR having 1.6 nm (200 Ghz) channel spacing and 38.4 nm free spectral range is employed. The 24x24 silica WGR has 24 input ports and 24 output ports, and spectrally slices a broadband optical input signal at one input port into 24 wavelength channels, each on a corresponding one of the 24 output ports. The loop-back configuration allows the WGR 300 to perform spectral slicing, timing delay, and time division multiplexing (TDM) of the wavelength channels. The loop-back configuration simplifies the WDM source configuration while reducing optical insertion loss and component cost for the WDM access transmitter. A WGR exhibiting the periodic routing property may be, for example, a NxN Arrayed Waveguide Grating Multi/Demultiplexing module available from Photonic Integration Research, Inc., of Columbus, Ohio.

The operation of the exemplary loop-back, spectrally sliced transmitter and, more particularly, the operation of wavelength channel defining assembly 22, is now described with reference to FIG. 3A. A 1.55 um LED for optical source 18 is cw operated and a amplifier-modulator 302 is used to amplify and pulse the broadband LED output signal. The amplifier-modulator 302 (corresponding to the amplifier 25 and modulator 26 of FIG. 1) may be implemented, for example, as a monolithically integrated semiconductor device. The amplifier-modulator 302 is typically polarization insensitive and may use an electro-absorption modulator, which may be integrable with the LED, to significantly increase the modulation bandwidth of the LED to 8 Gb/s. For 24 WDM channels to operate at 50 Mb/s each, the LED is pulsed into 0.83 ns pulses, repeating at 50 Mhz. The pulsed output may be further amplified by an amplifier 20, which may be an EDFA, and is then processed by spectral slicing and routing using a silica WGR 300 of wavelength channel defining assembly 22. Spectral slicing by WGR 300, as described previously, divides the pulsed LED output signal into 24 wavelength channels according to the multiwavelength filter transmission function of the WGR 300. Each of the wavelength channels is routed to a corresponding output port of the 24x24 silica WGR.

As described subsequently, the wavelength channel defining device 22 employs a loop-back process to multiplex the 24 wavelength channels from the 24 output ports of the silica WGR onto a single optical transmission line. By employing a loop-back of one wavelength channel appearing on an output port to an unused input port of the WGR, the one wavelength channel may be re-routed to a different, predetermined output port of the WGR, and by inserting a delay, the one wavelength channel may then be multiplexed with another wavelength channel already present on the predetermined output port. The re-routing function is derived from the routing property of the WGR 300. The routing property of an NxN WGR is given by equation 1:

$$N_{out} = N_\lambda - N_{in} + 1 \quad (N>0) \qquad (1)$$

$$N_{out} = N_\lambda - N_{in} + 1 + N \quad (N \leq 0)$$

In equation 1, $N_\lambda$ is the wavelength channel number, and $N_{in}$ is the input port number and $N_{out}$ is the output port number of the WGR 300.

FIG. 5 illustrates a routing matrix for a WGR developed from equation 1 and as used in the present invention. The matrix indicates the relationship between the input port, output port and wavelength channel for the WGR 300. The input port, wavelength channel and output port correspondence of the matrix may be employed for multiplexing of the wavelength channels onto a single output port of the WGR 300.

Referring to the matrix illustrated in FIG. 5, the input port numbers 501 are listed on the left hand column of the matrix, the output port numbers 502 are listed on the top row of the matrix, and the corresponding wavelength channel numbers appear as entries within the matrix. As shown, for example, if an optical signal is applied to input port 1, the wavelength channel at output port 5 will be wavelength channel 5.

For an exemplary embodiment in which all wavelength channels are to appear as a time division multiplexed optical channel at the output port 1, the discrete wavelength channels appearing at particular output ports are re-routed to the output port 1. Since the wavelength channels are discrete pulses, the channels can be separated by a time delay by optical delay lines inserted for the loop-back from the output port to the input port. Therefor, by choosing appropriate delays, the re-routed wavelength channels will not interfere with other wavelength channels on the same port.

Returning to FIG. 5, a signal appearing at the input port one has output wavelength channel(s) corresponding to the output port number (i.e. wavelength channel 2 appears at output port 2, wavelength channel 5 appears at output port 5, and so on). If one wishes the wavelength channel 5 appearing at output port 5, for example, to be multiplexed onto the output port 1, the wavelength channel 5 corresponding to the output port 1 is found within the matrix in the column below output port 1 of row 502. The input port in column 501 corresponding to wavelength channel 5 appearing on output port 1 is read from the matrix as input port number 5. Consequently, if wavelength channel 5 at output port 5 is looped back to the input port 5, the wavelength channel 5 will appear at output port 1. This loop-back process is repeated for all wavelength channels until all channels appear at output port 1.

Referring to FIG. 3A, fiber delay lines 301*a*–301*d* having integer multiples of pulse width delay are inserted between the output port and the corresponding input port of the WGR 300 in a manner defined in FIG. 5 for all but one of the wavelength channels, which for the exemplary embodiment is wavelength channel 1. As previously indicated, integer multiples of pulse width delay are inserted so that the wavelength channel pulses do not appear at the output port at the same time. For the exemplary embodiment, the fiber delay lines are integer multiples of 17 cm corresponding to integer multiples of 0.83 ns delay. The periodic routing property of the WGR 300, combined with the delay inserted by respective fiber delay lines 301*a*–301*d* multiplexes each of the spectrally-sliced WDM channels into a single TDM sequence on the output fiber corresponding to the one input port not looped-back with a fiber delay line.

Consequently, each WDM channel is successively delayed by one pulse width, and a pulse train of all the WDM can then be generated by simply pulsing the LED for one pulse width. The WDM pulse train then goes through an amplifier-modulator which is used for data modulation of each WDM channel, and then transmitted to a receiver. Referring to FIG. 1, a bulk InGaAsP waveguide modulator is the preferred modulator 26 for this exemplary embodiment; however, any broadband optical modulator could be used. The output of modulator 26 is transmitted over an optical medium 28 (e.g., a single-mode optical fiber) to a multiple wavelength receiver 14 comprising, for example, a passive WDM splitter router 30 which demultiplexes the received optical signal into a plurality of modulated optical wavelength channels 32 (e.g., 50 MHz WDM channels) intended for the optical network unit 34 (ONU) of a particular subscriber.

Figure 6:
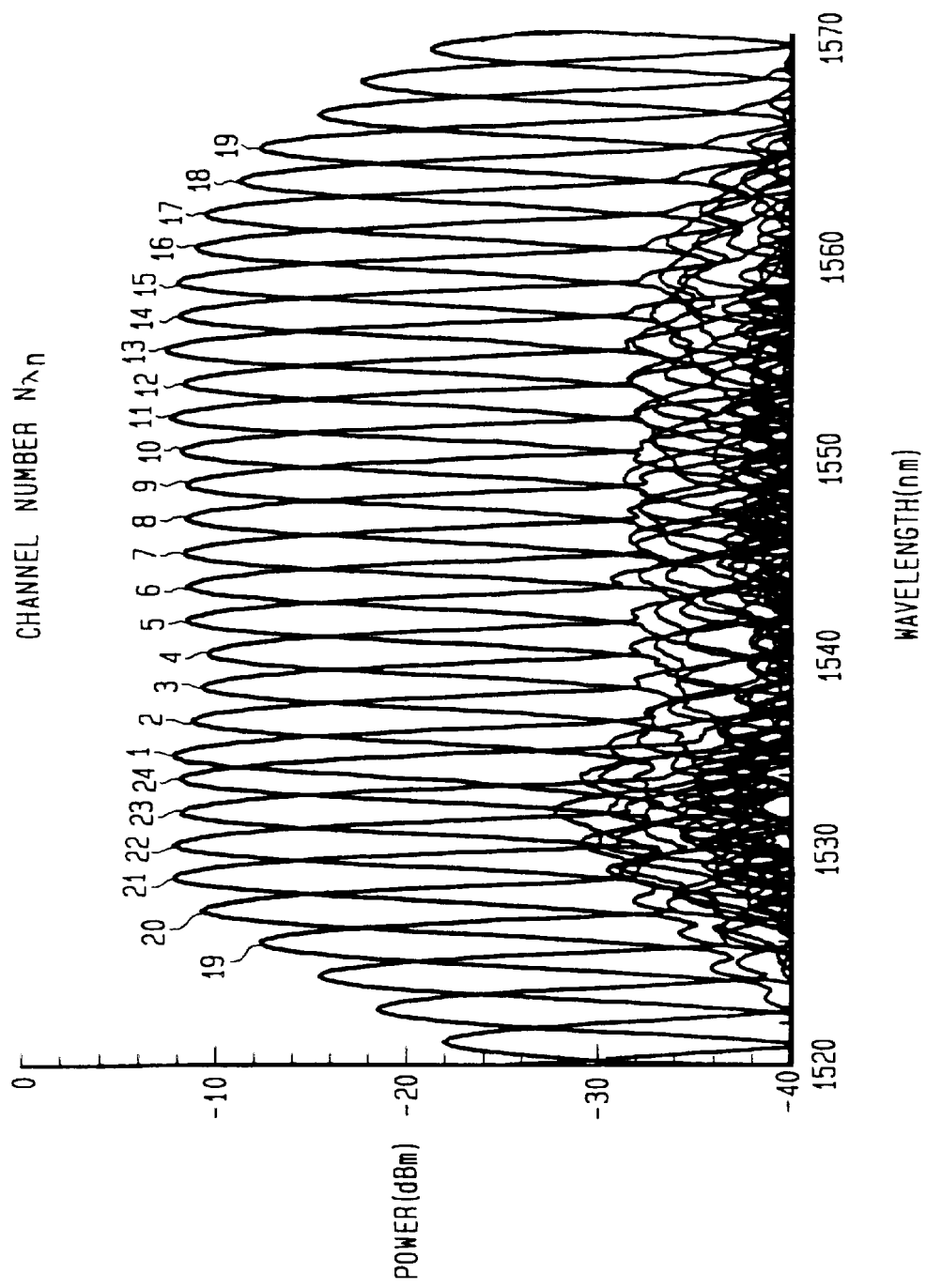
FIG. 6 illustrates spectrally sliced output spectra of 24 WDM channels of a wavelength grating router of an exemplary embodiment of the present invention.
Figure 7:
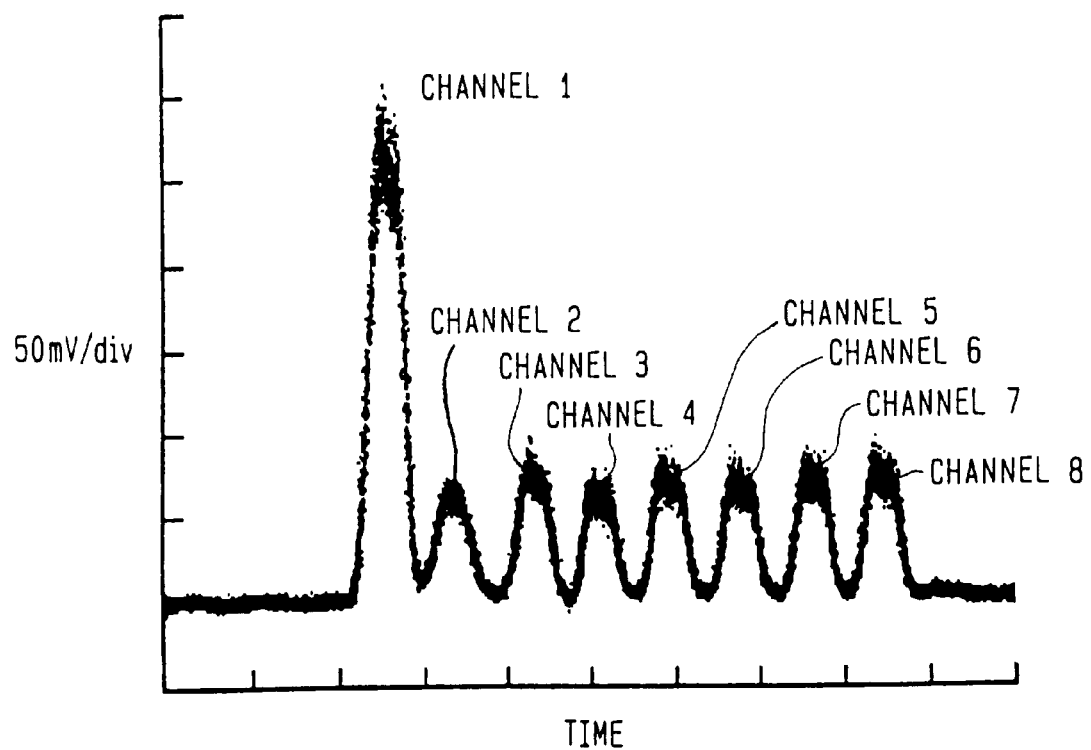
FIG. 7 illustrates a detected output pulse train from when 8 WDM channels are loop-back multiplexed onto a first input port of the wavelength grating router in accordance with the present invention.

FIG. 6 illustrates the spectrally sliced output spectra of the 24 WDM channels of the exemplary embodiment of the present invention. As shown in FIG. 6, each channel wavelength is accurately spaced by the 200 GHz spectral spacing of the WGR 300, and each channel has approximately −10 dBm to −8 dBm power level. All channels have one dominant spectral peak, except channel 19 which has two comparable peaks which are spaced according to the free spectral range of the WGR 300. Because the bit-interleaved WDM/TDM modulation format is used, the free spectral range repetition does not impose a significant dispersion penalty in a local access system. The FIG. 7 shows a detected output pulse train from the WDM source when the first 8 WDM channels are loop-back multiplexed onto output port 1. The measured insertion loss of the exemplary embodiment may be approximately 6 dB. Because channels 2–8 pass through the WGR 300 twice but channel 1 only passes through once, channel 1 has 6 dB more power than the other channels.

Figure 8:
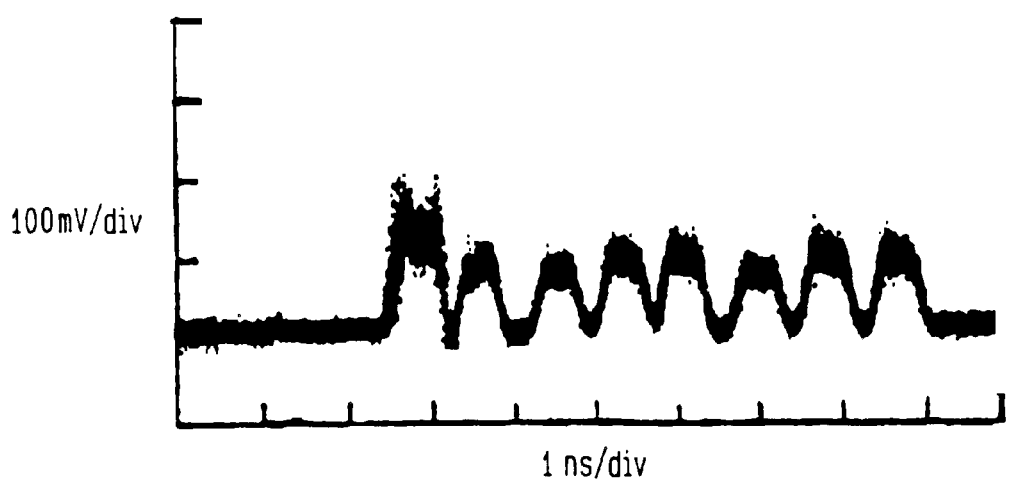
FIG. 8 illustrates a pulse train of eight time division multiplexed WDM channels of an exemplary embodiment of the present invention in which channel one is power-equalized.

Equalization may be used to reduce the power of channel one to reduce interference or cross-talk caused by the higher power level in the TDM spectrally sliced system. The power level of channel one may be equalized to that of the other channels by applying complimentary electrical pulses to data modulator 303 shown in FIG. 3A. Complimentary electrical pulses may formed by applying an inverted pulse signal from the pulse generator 304. The inverted pulse signal is synchronized with the optical pulses arriving at the data modulator 303, and the amplitude of the inverted electrical pulse signal is adjusted to attenuate the optical power of channel one to that of the other channels. FIG. 8 illustrates a power equalized pulse train of an exemplary embodiment of the present invention for eight time division multiplexed WDM channels.

Interference and cross-talk between adjacent channels within the TDM spectrally sliced system may also be substantially reduced or eliminated by re-ordering of the wavelength channels. The desired order may be determined from the routing matrix as previously described. For example, in an eight channel WDM system, a wavelength channel sequence order of [1, 4, 7, 2, 5, 8, 3, 6] may nearly eliminate adjacent channel cross-talk.

The loop-back method employing fiber delay lines eliminates the need for a second WGR, which has a considerable cost, to multiplex the WDM channels into a single fiber, and eliminates the alternative need for a N×1 star coupler, which has a relatively high insertion loss (given by 1/N), to multiplex the WDM channels into a single fiber.

Figure 3B:
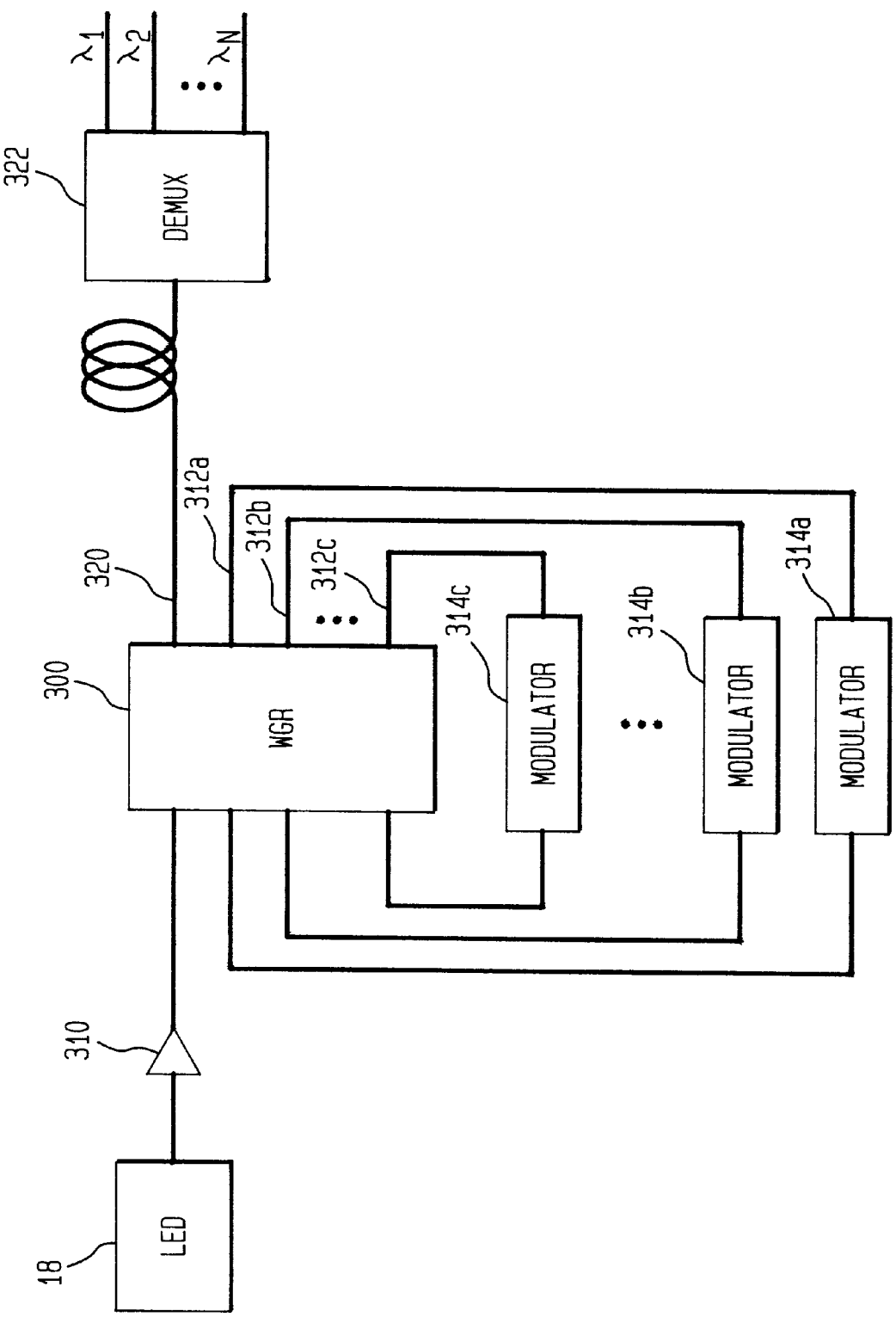
FIG. 3B shows an exemplary system employing loop-back spectral slicing to provide discrete wavelength channels multiplexed together in accordance with the present invention.

The present invention may also be used to spectrally slice a continuous broadband optical source spectrum, modulate the discrete wavelengths, and then WDM the modulated channels together as a single output optical signal. FIG. 3B shows an exemplary system employing loop-back spectral slicing to provide discrete wavelength channels multiplexed together in accordance with an alternative embodiment which does not perform TDM of modulated discrete wavelength pulses.

As shown in FIG. 3B, the 1.55 mm LED 18 is operated as continuous wave (cw). Optional optical amplifier 310 is used to increase the power level of the LED 18. WGR 300 receives the broadband optical signal and spectrally slices the frequency spectrum into discrete wavelength bands which are routed to specific output ports of the WGR 300, as described previously with reference to FIG. 3A.

Fiber lines 312*a*–312*c*, having arbitrary optical delays, are inserted between the output port and the corresponding input port of the WGR 300 in a manner defined in FIG. 5 for all but one of the wavelength channels, which for the exemplary embodiment is wavelength channel 1. Further, each fiber line includes a separate data modulator 314*a*–314*c* which modulates each discrete wavelength channel with a corresponding data channel. The fiber line delays may be arbitrary because the wavelength channels are only separated in frequency, and not also in time as is present in the TDM system of FIG. 3A. Once the modulated discrete wavelength channels are reapplied to the WGR 300, they are recombined into a single optical signal at the output port 320. The periodic routing property of the WGR 300, combined with the respective fiber lines 312a–312c multiplexes each of the spectrally-sliced WDM channels into a WDM optical signal on the output fiber corresponding to the one input port not looped-back with a fiber delay line.

However, because one channel is not looped back to the WGR 300, this one channel does not pass through a modulator, and so does not a modulated data channel. Also, since TDM is not used, each discrete optical wavelength channel may be modulated at a higher data rate. Multiples of pulse width delay are not required since the WDM multiplexing operation simply recombines the discrete wavelength bands into a single broadband optical signal. For the exemplary embodiment, a comb filter device, such as another WGR, is used to separate the modulated discrete frequency bands $\lambda_1$–$\lambda_N$ at the demultiplexing receiver 322.

Although the foregoing detailed description has described the present invention primarily in terms of particular applications of spectrally sliced-source WDM systems, it should be understood that the embodiments discussed are exemplary only. Many variations may be made in the arrangements shown, including the type of optical signal source, the selection and arrangement of channel filtering and optical coupling components within the wavelength channel defining assembly, the type of optical modulator, the type of WDM splitter, and the type of network architecture for implementation of a loop-back, spectrally sliced, WDM system. These and other alternatives and variations will be readily apparent to those skilled in the art, and the present invention is therefore limited only by the appended claims.

What is claimed:

1. An optical multiple wavelength multiplexing apparatus, said apparatus comprising:
   a broad spectrum optical source having an optical source signal spectral bandwidth encompassing a plurality of discrete wavelength bands;
   a channel defining assembly having a plurality of input and output ports, said optical source optically coupled to one of said plurality of input ports, having
   a) wavelength resolving means for resolving the optical source signal into said plurality of discrete wavelength bands and for routing said discrete wavelength bands between said one input port and at least one output port in accordance with a routing function to define a sequence of individually addressable wavelength channels, and
   b) optical coupling means for coupling at least one output port and at least one input port in accordance with said routing function, thereby to multiplex said sequence of individually addressable wavelength channels into an optical signal at at least one output port.

2. The optical multiple wavelength multiplexing apparatus as recited in claim 1, wherein said optical source includes means for generating said optical source signal defining a sequence of output pulses at a predetermined rate, and said optical coupling means includes means for providing predetermined time delays between said specific ones of said plurality of output and input ports to define said sequence of individually addressable wavelength channels.

3. The optical multiple wavelength multiplexing apparatus as recited in claim 2, further including an optical modulator encoding at least one optical wavelength channel using a data signal operating at a second rate equal to or greater than said first rate to form at least one encoded optical channel.

4. The optical multiple wavelength multiplexing apparatus as recited in claim 2, wherein said means for providing predetermined delays includes a plurality of optical fiber delay lines, each delay line being optically coupled between corresponding ones of said plurality of output and input ports of the wavelength resolving means for delaying a time when optical pulses associated with a specific one of said sequence of individually addressable wavelength channels arrive at an output port of the wavelength resolving means relative to when pulses associated with other wavelength channels arrive.

5. The optical multiple wavelength multiplexing apparatus as recited in claim 2, wherein the optical source is an optically amplified light emitting diode and said means for generating said optical source signal defining said sequence of output pulses includes a pulse generator modulating said optical amplified light emitting diode.

6. The optical multiple wavelength multiplexing apparatus as recited in claim 1, wherein the wavelength resolving means is a wavelength grating router having a periodic routing function.

7. The optical multiple wavelength multiplexing apparatus as recited in claim 1, wherein said optical source includes means for generating said optical source signal continuously, said optical coupling means further includes at least one modulating means for modulating at least one of said individually addressable wavelength channels with a data signal, and said optical signal at said at least one output port is a wavelength division multiplexed optical signal having said individually addressable wavelength channels aligned in frequency.

8. The optical multiple wavelength multiplexing apparatus as recited in claim 7, wherein the optical source is a continuously operated optically amplified light emitting diode.

9. The optical multiple wavelength multiplexing apparatus as recited in claim 7, wherein the optical coupling means includes a plurality of optical fiber lines.

10. The method of multiplexing multiple wavelengths as recited in claim 1, wherein:
   said step of providing said optical source signal includes the step of generating said optical source signal defining a sequence of output pulses at a predetermined rate; and
   said step of coupling includes providing predetermined time delays between said specific ones of said plurality of output and input ports to define said sequence of individually addressable wavelength channels.

11. The method of multiplexing multiple wavelengths as recited in claim 1, wherein:
   said step of providing said optical source signal includes the step of generating said optical source signal continuously;
   said coupling step further includes the step of modulating at least one of said individually addressable wavelength channels with a data signal; and
   said optical signal at said at least one output port is a wavelength division multiplexed optical signal having said individually addressable wavelength channels aligned in frequency.

12. A method of multiplexing multiple optical wavelengths using a channel defining assembly having a plurality of input and output ports, the method comprising the steps of:

a) providing an optical source signal having a spectral bandwidth encompassing a plurality of discrete wavelength bands;
b) coupling said optical source signal to one input port of said channel defining assembly;
c) resolving, within the channel defining assembly, the optical source signal into said plurality of discrete wavelength bands;
d) routing said discrete wavelength bands between said one input port and at least one output port of a plurality of input and output ports in accordance with a routing function to define a sequence of individually addressable wavelength channels, and
e) coupling at least one output port and at least one input port in accordance with said routing function, thereby to multiplex said sequence of individually addressable wavelength channels into an optical signal at at least one output port.

* * * * *